United States Patent
Ohtomo et al.

(10) Patent No.: US 9,172,113 B2
(45) Date of Patent: Oct. 27, 2015

(54) SULFIDE SOLID ELECTROLYTE MATERIAL, LITHIUM SOLID-STATE BATTERY, AND METHOD FOR PRODUCING SULFIDE SOLID ELECTROLYTE MATERIAL

(75) Inventors: Takamasa Ohtomo, Susono (JP); Koji Kawamoto, Miyoshi (JP); Shigenori Hama, Susono (JP); Yuki Kato, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/130,105

(22) PCT Filed: Jun. 19, 2012

(86) PCT No.: PCT/IB2012/001203
§ 371 (c)(1),
(2), (4) Date: Dec. 30, 2013

(87) PCT Pub. No.: WO2013/005085
PCT Pub. Date: Jan. 10, 2013

(65) Prior Publication Data
US 2014/0141341 A1    May 22, 2014

(30) Foreign Application Priority Data
Jul. 6, 2011    (JP) .................................. 2011-150002

(51) Int. Cl.
*H01M 10/0562* (2010.01)
*H01M 10/052* (2010.01)
(Continued)

(52) U.S. Cl.
CPC ............ *H01M 10/0562* (2013.01); *C03C 4/18* (2013.01); *C03C 10/16* (2013.01); *H01M 10/052* (2013.01); *H01M 2300/0068* (2013.01); *Y02E 60/122* (2013.01); *Y02T 10/7011* (2013.01)

(58) Field of Classification Search
CPC ..................................................... H01M 10/052
USPC .................................................. 429/319, 323
See application file for complete search history.

(56) References Cited

U.S. PATENT DOCUMENTS 4,331,750 A   5/1982 Malugani et al.
5,227,148 A   7/1993 Akridge et al.
(Continued)

FOREIGN PATENT DOCUMENTS

CN   1918668 A    2/2007
EP   0 079 228 A1  5/1983
(Continued)

OTHER PUBLICATIONS

Rao et al., "Li+ Conductivity and Migration Pathway Studies of LiCl doped 0.6Li2S-0.4P2S5 Glassy Electrolyte for All-Solid-State Batteries," The 15$^{th}$ International Meeting on Lithium Batteries—IMLB 2010.

(Continued)

*Primary Examiner* — Stewart Fraser
*Assistant Examiner* — Rachel Zhang
(74) *Attorney, Agent, or Firm* — Oliff PLC

(57) ABSTRACT

A sulfide solid electrolyte material contains glass ceramics that contains Li, A, X, and S, and has peaks at $2\theta=20.2°$ and $23.6°$ in X-ray diffraction measurement with CuKα line. A is at least one kind of P, Si, Ge, Al, and B, and X is a halogen. A method for producing a sulfide solid electrolyte material includes amorphizing a raw material composition containing $Li_2S$, a sulfide of A, and LiX to synthesize sulfide glass, and heating the sulfide glass at a heat treatment temperature equal to or more than a crystallization temperature thereof to synthesize glass ceramics having peaks at $2\theta=20.2°$ and $23.6°$ in X-ray diffraction measurement with CuKα line, in which a ratio of the LiX contained in the raw material composition and the heat treatment temperature are controlled to obtain the glass ceramics.

11 Claims, 6 Drawing Sheets

(51) Int. Cl.
*C03C 4/18* (2006.01)
*C03C 10/16* (2006.01)

(56) References Cited

U.S. PATENT DOCUMENTS

| | | |
|---|---|---|
| 6,200,707 B1 | 3/2001 | Takada et al. |
| 2007/0160911 A1 | 7/2007 | Senga et al. |
| 2007/0264579 A1 | 11/2007 | Ota |
| 2008/0268348 A1 | 10/2008 | Katoh |
| 2011/0143213 A1 | 6/2011 | Ota et al. |
| 2013/0164631 A1 | 6/2013 | Ohtomo et al. |
| 2014/0141341 A1 | 5/2014 | Ohtomo et al. |

FOREIGN PATENT DOCUMENTS

| | | |
|---|---|---|
| JP | A-59-73850 | 4/1984 |
| JP | A-59-151700 A | 8/1984 |
| JP | A-07-330312 | 12/1995 |
| JP | A-11-086899 | 3/1999 |
| JP | A-2002-329524 | 11/2002 |
| JP | 2005-228570 A | 8/2005 |
| JP | A-2007-305552 | 11/2007 |
| JP | A-2008-103145 | 5/2008 |
| JP | 2009-093995 A | 4/2009 |
| JP | A-2009-283344 | 12/2009 |
| JP | A-2012-48973 | 3/2012 |
| JP | A-2012-104279 | 5/2012 |
| JP | 2013-016423 A | 1/2013 |
| WO | WO 2005/040039 A1 | 5/2005 |
| WO | WO 2010/106412 A1 | 9/2010 |
| WO | 20101/46911 A1 | 12/2010 |
| WO | WO 2012/026561 A2 | 3/2012 |
| WO | WO 20130177821 * | 3/2012 |

OTHER PUBLICATIONS

Stadler et al., "Crystalline Halide Substituted Li-Argyrodites as Solid Electrolyte for Lithium Ion Batteries," *The Electrochemical Society*, 216$^{th}$ ECS Meeting, Abstract No. 590.

Kennedy et al.,Preparation and Conductivity Measurements of $SiS_2$—$Li_2S$ Glasses Doped with LiBr and LiCl, *Solid State Ionics*, 1986, vol. 18 & 19, pp. 386-371.

Wada et al., "Preparation and Ionic Conductivity of New $B_2S_3$—$Li_2S$-LiI Glasses," *Mat. Res. Bull.*, 1983, vol. 18, pp. 189-193.

Kennedy et al., "Further Characterization of SiS2—Li2S Glasses Doped with Lithium Halide," *Journal of the Electrochemical Society*, Apr. 1988, vol. 135, No. 4, pp. 859-862.

Kennedy et al., "Glass-Forming Region and Structure in $SiS_2$—$Li_2S$—LiX (X=Br, I)," *Journal of Solid State Chemistry*, 1987, vol. 69, pp. 252-257.

Tomei et al., "Preparation of Amorphous Materials in the System LiI—Li2S—P2S5 by Mechanical Milling and Their Lithium Ion Conducting Properties," *Konan University*, pp. 26-27 (with abstract).

Mizuno et al., "High Lithium Ion Conducting Glass-Ceramics in the System Li2S—P2S5," Solid State Ionics, 177 (2006), p. 2721-2725.

Partial Translation of Nov. 25, 2014 Office Action issued in Japanese Application No. 2013-261165.

* cited by examiner

SULFIDE SOLID ELECTROLYTE MATERIAL, LITHIUM SOLID-STATE BATTERY, AND METHOD FOR PRODUCING SULFIDE SOLID ELECTROLYTE MATERIAL

BACKGROUND OF THE INVENTION

1. Field of the Invention

The present invention relates to a sulfide solid electrolyte material that has high Li ion conductivity.

2. Description of Related Art

In recent years, as information-related devices and communication devices such as personal computers, video cameras, and portable telephones are rapidly spreading, a development of batteries used as power supply thereof is regarded as important. Further, also in an automobile industry and so on, batteries for electric automobiles or hybrid automobiles, which have high output and high capacity, are under development. At the present time, among various kinds of batteries, lithium batteries are under attention from the viewpoint of high energy density.

Lithium batteries that are commercially available at the present time use an electrolytic solution containing inflammable organic solvent, and accordingly, a safety device that can prevent the temperature from increasing at the time of short-circuiting has to be provided and an improvement in structure and material for preventing the short-circuiting is necessary. On the other hand, all-solid-state lithium batteries in which a solid electrolyte layer is used in place of the electrolytic solution do not contain inflammable organic solvent therein, and accordingly a safety device can be simplified. The all-solid-state lithium batteries are thus considered to be superior in production costs and productivity. Further, as solid electrolyte materials usable for the solid electrolyte layer like this, sulfide solid electrolyte materials have been known.

The sulfide solid electrolyte materials have high Li ion conductivity and are advantageous in realizing higher output of the battery, and accordingly, various studies have been conducted thereon. For example, in Tomei et al., "Preparation of Amorphous Materials in the system LiI—$Li_2S$—$P_2S_5$ by Mechanical Milling and Their Lithium Ion Conducting Properties", Proceedings of The Symposium On Solid State Ionics, Vol. 23, p. 26-27 (2003) (non-Patent Document 1), LiI—$Li_2S$—$P_2S_5$ system amorphous materials obtained by mechanical milling are disclosed. Further, in F. Stader et al., "Crystalline halide substituted Li-argyrodites as solid electrolyte for lithium ion batteries", $216^{th}$ ECS (The Electrochemical Society) Meeting with EuroCVD 17 and SOFC XI-$11^{th}$ International Symposium On Solid Oxide Fuel Cells, 2009, http://www.electrochem.org/meetings/scheduler/abstracts/216/0590.pdf (non-Patent Document 2), crystalline materials represented by $Li_6PS_5X$ (X=Cl, Br, I) are disclosed.

SUMMARY OF THE INVENTION

Sulfide solid electrolyte materials having high Li ion conductivity are in demand. The present invention provides sulfide solid electrolyte materials having high Li ion conductivity.

After earnest studies were conducted, the present inventors found that, when synthesizing glass ceramics by heat-treating LiX-doped sulfide glass, in a limited range of each of addition amount of LiX and heat treatment temperature, glass ceramics having extremely high Li ion conductivity can be obtained. Further, the present inventors also found that the high Li ion conductivity is due to a novel crystalline phase that has not been known. The present invention is achieved based on these findings.

Namely, a first aspect of the present invention relates to a sulfide solid electrolyte material. The sulfide solid electrolyte material contains a glass ceramics having Li, A, X, and S. A is at least one element of P, Si, Ge, Al and B, X is a halogen. The sulfide solid electrolyte material has peaks at $2\theta=20.2°$ and $23.6°$ in X-ray diffraction measurement with CuKα line.

According to the first aspect of the present invention, owing to specified peaks in X-ray diffraction measurement, the sulfide solid electrolyte material can have high Li ion conductivity.

In the sulfide solid electrolyte material, the glass ceramics may include an ion conductor containing Li, A, and S, and LiX.

In the sulfide solid electrolyte material, a ratio of the LiX may be 14% by mole or more and less than 30% by mole.

In the sulfide solid electrolyte material, the ratio of the LiX may be more than 14% by mole and less than 30% by mole.

In the sulfide solid electrolyte material, the ratio of the LiX may be 25% by mole or less.

In the sulfide solid electrolyte material, the ion conductor may have an ortho composition. This is because the sulfide solid electrolyte material may have high chemical stability.

The sulfide solid electrolyte material may include 50% by mole or more of a crystalline phase corresponding to the $2\theta=20.2°$ and $23.6°$ relative to a total crystalline phase of the sulfide solid electrolyte material.

A second aspect of the present invention relates to a lithium solid-state battery. The lithium solid-state battery includes a positive electrode active material layer containing a positive electrode active material, a negative electrode active material layer containing a negative electrode active material, and a solid electrolyte layer formed between the positive electrode active material layer and the negative electrode active material layer. At least one of the positive electrode active material layer, the negative electrode active material layer, and the solid electrolyte layer includes the sulfide solid electrolyte material described above.

According to the second aspect of the present invention, by use of the sulfide solid electrolyte material, a lithium solid-state battery having high Li ion conductivity can be obtained. As the result thereof, output power of the lithium solid-state battery can be made higher.

A third aspect of the present invention relates to a lithium solid-state battery. The lithium solid-state battery includes a positive electrode active material layer containing a positive electrode active material, a negative electrode active material layer containing a negative electrode active material, and a solid electrolyte layer formed between the positive electrode active material layer and the negative electrode active material layer. At least one of the positive electrode active material layer, the negative electrode active material layer and the solid electrolyte layer includes the sulfide solid electrolyte material described above. The LiX being LiI. The positive electrode active material has a potential of 2.8 V or more with respect to Li.

Further, a fourth aspect of the present invention relates to a method for producing a sulfide solid electrolyte material. The method for producing a sulfide solid electrolyte material includes: amorphizing a raw material composition containing $Li_2S$, a sulfide of A, and LiX to synthesize sulfide glass; and heating the sulfide glass at a heat treatment temperature equal to or more than a crystallization temperature of the sulfide glass to synthesize glass ceramics having peaks at $2\theta=20.2°$ and $23.6°$ in X-ray diffraction measurement with CuKα line.

A is at least one element of P, Si, Ge, Al and B. X is a halogen. A ratio of the LiX contained in the raw material composition and the heat treatment temperature are controlled to obtain the glass ceramics.

According to the fourth aspect of the present invention, by controlling the ratio of LiX contained in the raw material composition and the heat treatment temperature in the step of heating, sulfide solid electrolyte materials having high Li ion conductivity can be obtained.

In the method for producing a sulfide solid electrolyte material, the ratio of the LiX contained in the raw material composition may be in a first range of 14% by mole or more and less than 30% by mole or in a second range in a vicinity of the first range and allows to synthesize the glass ceramics, and an upper limit of the heat treatment temperature is a temperature that allows to synthesize the glass ceramics in a vicinity of 200° C.

In the method for producing a sulfide solid electrolyte material, the ratio of the LiX contained in the raw material composition may be 14% by mole or more and less than 30% by mole, and the heat treatment temperature may be less than 200° C.

In the method for producing a sulfide solid electrolyte material, the heat treatment temperature may be 170° C. or more. In the method for producing sulfide a solid electrolyte material, the heat treatment temperature may be 190° C. or less.

The present invention achieves the effect of obtaining sulfide solid electrolyte materials having high Li ion conductivity.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
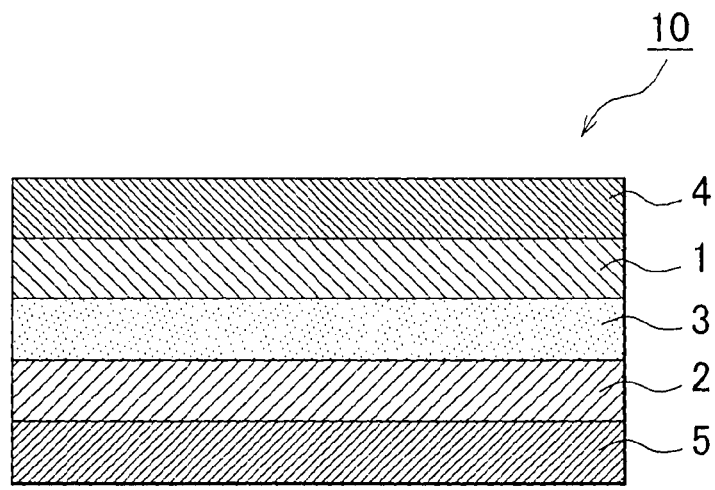
FIG. 1 is a schematic sectional view showing an example of a lithium solid-state battery of the present invention.

A sulfide solid electrolyte material, a lithium solid-state battery, and a method for producing the sulfide solid electrolyte material will be described below in details.

A. Sulfide Solid Electrolyte Material

Firstly, a sulfide solid electrolyte material according to an embodiment of the invention will be described. The sulfide solid electrolyte material of the embodiment of the invention is glass ceramics that contains Li, A (A is at least one kind of P, Si, Ge, Al and B), X (X is a halogen) and S, and has peaks at $2\theta=20.2°$ and $23.6°$ in X-ray diffraction measurement with CuKα line.

According to the invention, owing to specified peaks in X-ray diffraction measurement, the sulfide solid electrolyte materials having high Li ion conductivity can be obtained. These peaks are peaks of a novel crystalline phase that is unknown until now. Since the Li ion conductivity of the novel crystalline phase is high, the Li ion conductivity of the sulfide solid electrolyte material can be improved.

Further, since the sulfide solid electrolyte material according to the embodiment of the invention is glass ceramics, it has an advantage that the heat resistance thereof is higher than that of sulfide glass. For example, when LiI is doped in $Li_2S$—$P_2S_5$ system sulfide glass, the Li ion conductivity can be enhanced. However, when LiI is doped, in some cases, the crystallization temperature of the sulfide glass can be lowered. In the case where the sulfide glass of which crystallization temperature is low is used in, for example, a battery, when a temperature of the battery reaches the crystallization temperature of the sulfide glass or more, heat generation caused by crystallization of the sulfide glass occurs. As the result thereof, the respective materials configuring the battery may be altered (deteriorated) or a battery case and so on may be damaged. On the other hand, according to the present invention, by preparing glass ceramics crystallized in advance, the sulfide solid electrolyte material in which adverse affect of heat generation due to crystallization is inhibited can be obtained. Further, there are advantages also in that a cooling mechanism and a safety mechanism for the battery can be simplified.

Further, in Tomei et al., "Preparation of Amorphous Materials in the system LiI—$Li_2S$—$P_2S_5$ by Mechanical Milling and Their Lithium Ion Conducting Properties", Proceedings of The Symposium On Solid State Ionics, Vol. 23, p. 26-27 (2003) (non-Patent Document 1), LiI—$Li_2S$—$P_2S_5$ system amorphous materials obtained by mechanical milling are disclosed. However, in the non-Patent Document 1, the heat treatment of the LiI—$Li_2S$—$P_2S_5$ system sulfide glass is neither disclosed nor indicated. Further, even when the LiI—$Li_2S$—$P_2S_5$ system sulfide glass is heat-treated, in order to precipitate the novel crystalline phase, it is necessary to adjust a ratio of LiI and a heat treatment temperature. However, there is no indication thereof in the non-Patent Document 1. On the other hand, in F. Stader et al., "Crystalline halide substituted Li-argyrodites as solid electrolyte for lithium ion batteries", $216^{th}$ ECS (The Electrochemical Society) Meeting with EuroCVD 17 and SOFC XI-$11^{th}$ International Symposium On Solid Oxide Fuel Cells, 2009, http://www.electrochem.org/meetings/scheduler/abstracts/216/0590.pdf (non-Patent Document 2), crystalline materials represented by $Li_6PS_5X$ (X=Cl, Br, I) are disclosed. However, it is also disclosed that when I is added, the Li ion conductivity of the crystalline material is deteriorated. Namely, it is indicated that the Li ion conductivity cannot be improved in crystal (glass ceramics) merely by addition of halogen.

The sulfide solid electrolyte material of the embodiment of the invention may be glass ceramics. The glass ceramics of the invention refers to a material obtained by crystallizing sulfide glass. Whether it is glass ceramics can be confirmed by, for example, X-ray diffraction. Further, the sulfide glass refers to a material that is synthesized by amorphizing raw material compositions, including not only an exact "glass" in which the periodicity as crystal is not observed in X-ray diffraction measurement, but also materials in general that are synthesized by amorphizing by mechanical milling that will be described below. Accordingly, even when, in X-ray diffraction measurement and so on, peaks derived from, for example, raw materials (Li and so on) are observed, as long as a material is synthesized by amorphizing, it corresponds to sulfide glass.

The sulfide solid electrolyte material according to the embodiment of the invention has peaks at $2\theta=20.2°$ and $23.6°$ in X-ray diffraction measurement with CuKα line. These peaks are peaks of a novel crystalline phase that is unknown until now and has high Li ion conductivity. Hereinafter, in some cases, the crystalline phase is referred to as a crystalline phase having high Li ion conductivity. Here, a peak at $2\theta=20.2°$ refers to not only a peak exactly at $2\theta=20.2°$, but also a peak in the range of $2\theta=20.2°\pm0.5°$. Depending on a state of the crystal, a position of the peak can be varied slightly, and accordingly, the definition as mentioned above is adopted. Similarly, a peak at $2\theta=23.6°$ refers to not only a peak exactly at $2\theta=23.6°$, but also a peak in the range of $2\theta=23.6°\pm0.5°$. The sulfide solid electrolyte material according to the embodiment of the invention preferably mainly has the crystalline phase having high Li ion conductivity. Specifically, a ratio of the crystalline phase having high Li ion conductivity is preferably 50% by mole or more in an entire crystalline phase.

On the other hand, the sulfide solid electrolyte material according to the embodiment of the invention has, in some cases, peaks at $2\theta=21.0°$ and $28.0°$ in X-ray diffraction measurement with CuKα line. These peaks were found by our studies and are peaks of a novel crystalline phase that is unknown until now, as described above, and that has the Li ion conductivity lower than the high Li ion conductivity crystalline phase. Hereinafter, in some cases, the crystalline phase is referred to as a crystalline phase having low Li ion conductivity. Here, a peak at $2\theta=21.0°$ refers to not only a peak exactly at $2\theta=21.0°$, but also a peak in the range of $2\theta=21.0°\pm0.5°$. Depending on a state of the crystal, a position of the peak can be varied slightly, and accordingly, the definition as mentioned above is adopted. Similarly, a peak at $2\theta=28.0°$ refers to not only a peak exactly at $2\theta=28.0°$, but also a peak in the range of $2\theta=28.0°\pm0.5°$. The sulfide solid electrolyte material according to the embodiment of the invention preferably contains the low Li ion conductivity crystalline phase at a lower ratio.

Further, it can be determined from results of X-ray diffraction measurement that the sulfide solid electrolyte material according to the embodiment of the invention has specified peaks. On the other hand, for example, when a ratio of the crystalline phase having high Li ion conductivity is low and a ratio of the crystalline phase having low Li ion conductivity is high, peaks at $2\theta=20.2°$ and $23.6°$ appear smaller, and peaks at $2\theta=21.0°$ and $28.0°$ appear larger. Now, a ratio of a peak intensity at $2\theta=20.2°$ to a peak intensity at $2\theta=21.0°$ is expressed as $I_{20.2}/I_{21.0}$, and a ratio of a peak intensity at $2\theta=23.6°$ to a peak intensity at $2\theta=21.0°$ is expressed as $I_{23.6}/I_{21.0}$. The sulfide solid electrolyte material of the embodiment of the invention is determined to have peaks at $2\theta=20.2°$ and $23.6°$ from each of $I_{20.2}/I_{21.0}$ and $I_{23.6}/I_{21.0}$ of 0.1 or more (preferably 0.2 or more). In the embodiment of the invention, $I_{20.2}/I_{21.0}$ is preferably 1 or more. This is because a sulfide solid electrolyte material with a high ratio of the crystalline phase having high Li ion conductivity can be obtained.

The sulfide solid electrolyte material of the embodiment of the invention includes Li, A (A is at least one kind of P, Si, Ge, Al and B), X (X is a halogen), and S. On the other hand, as described above, the sulfide solid electrolyte material of an embodiment of the invention has specified peaks in X-ray diffraction measurement. Here, the X-ray diffraction measurement is a method in which by analyzing results of diffraction of X-rays from a crystal lattice, an atomic arrangement in a crystal is specified. Accordingly, from the principle, a pattern of peaks in X-ray diffraction measurement depends on a crystal structure, but not largely depends on kinds of atoms configuring the crystal structure. Accordingly, irrespective of kinds of A and X, when the same crystal structure is formed, a similar pattern can be obtained. Namely, irrespective of kinds of A and X, when a crystalline phase having high Li ion conductivity is formed, a similar pattern can be obtained. A position of the pattern can be varied slightly. Also from this viewpoint, peaks at $2\theta=20.2°$ and $23.6°$ are preferably defined in a range of $2\theta=20.2°\pm0.5°$ and $23.6°\pm0.5°$, respectively.

Further, the sulfide solid electrolyte material of the embodiment of the invention is preferably configured of an ion conductor that includes Li, A (A is at least one kind of P, Si, Ge, Al and B), and S, and LiX (X is a halogen). At least a part of LiX is usually present incorporated in a structure of the ion conductor as a LiX component.

The ion conductor of the embodiment of the invention includes Li, A (A is at least one kind of P, Si, Ge, Al and B), and S. The ion conductor is not particularly limited as long as it includes Li, A, and S. However, among these, the ion conductor having an ortho composition is preferred. This is because a sulfide solid electrolyte material having high chemical stability can be obtained. Here, the ortho generally refers to an oxo acid with the highest degree of hydration among oxo acids obtained by hydrating the same oxide. In the embodiment of the invention, a crystal composition of sulfide to which $Li_2S$ is most added is referred to as ortho composition. For example, in an $Li_2S$—$P_2S_5$ system, $Li_3PS_4$ corresponds to the ortho composition, in an $Li_2S$—$Al_2S_3$ system, $Li_3AlS_3$ corresponds to the ortho composition, in an $Li_2S$—$B_2S_3$ system, $Li_3BS_3$ corresponds to the ortho composition, in an $Li_2S$—$SiS_2$ system, $Li_4SiS_4$ corresponds to the ortho composition, and in an $Li_2S$—$GeS_2$ system, $Li_4GeS_4$ corresponds to the ortho composition.

Further, in the embodiment of the present invention, "having an ortho composition" includes not only an exact ortho composition, but also a composition in the vicinity thereof. Specifically, "having an ortho composition" means that an anion structure of the ortho composition ($PS_4^{3-}$ structure, $SiS_4^{4-}$ structure, $GeS_4^{4-}$ structure, $AlS_3^{3-}$ structure, and $BS_3^{3-}$ structure) is mainly contained. A ratio of the anion structure of the ortho composition relative to a total anion structure in an ion conductor is preferably 60% by mole or more, more preferably 70% by mole or more, still more preferably 80% by mole or more, and particularly preferably 90% by mole or more. The ratio of the anion structure of the ortho composition can be determined by use of Raman spectrometry, NMR, XPS and so on.

Further, the sulfide solid electrolyte material of the embodiment of the invention is preferably obtained in such a manner that a raw material composition containing $Li_2S$, sulfide of A (A is at least one kind of P, Si, Ge, Al and B), and LiX (X is a halogen) is amorphized and further heat-treated.

The $Li_2S$ contained in the raw material composition preferably contains less impurities. This is because a side reaction can be suppressed. As a method for synthesizing $Li_2S$, a method described in, for example, Japanese Patent Application Publication No. 07-330312 (JP 07-330312 A) and so on can be cited. Further, $Li_2S$ is preferably purified by use of a method described in WO2005/040039. On the other hand, as the sulfide of A contained in the raw material composition, $P_2S_3$, $P_2S_5$, $SiS_2$, $GeS_2$, $Al_2S_3$, $B_2S_3$ and so on can be cited.

Further, the sulfide solid electrolyte material preferably does not substantially contain $Li_2S$. This is because a sulfide solid electrolyte material generating a smaller amount of hydrogen sulfide can be obtained. When $Li_2S$ reacts with water, hydrogen sulfide is generated. For example, when a ratio of $Li_2S$ contained in the raw material composition is high, $Li_2S$ tends to remain. Whether the sulfide solid electrolyte material "does not substantially contain $Li_2S$" can be confirmed by X-ray diffractometry. Specifically, when peaks of $Li_2S$ ($2\theta=27.0°$, $31.2°$, $44.8°$ and $53.1°$) are not contained, the sulfide solid electrolyte material is determined not to substantially contain $Li_2S$.

Still further, the sulfide solid electrolyte material preferably does not substantially contain cross-linked sulfur. This is because a sulfide solid electrolyte material generating a smaller amount of hydrogen sulfide can be obtained. The "cross-linked sulfur" refers to cross-linked sulfur in a compound formed by a reaction between $Li_2S$ and the sulfide of A. For example, cross-linked sulfur having an $S_3P$—S—$PS_3$ structure that is formed by a reaction between $Li_2S$ and $P_2S_5$ corresponds to this. This cross-linked sulfur tends to react with water and tends to generate hydrogen sulfide. Further, whether sulfide solid electrolyte material "does not substantially contain cross-linked sulfur" can be confirmed by Raman spectrum measurement. For example, in the case of the $Li_2S$—$P_2S_5$ system sulfide solid electrolyte material, a peak of the $S_3P$—S—$PS_3$ structure usually appears at 402 $cm^{-1}$. Accordingly, it is preferable that the peak is not detected. Further, a peak of a $PS_4^{3-}$ structure usually appears at 417 $cm^{-1}$. In the embodiment of the present invention, an intensity $I_{402}$ at 402 $cm^{-1}$ is preferably smaller than an intensity $I_{417}$ at 417 $cm^{-1}$. More specifically, relative to the intensity $I_{417}$, the intensity $I_{402}$ is preferably, for example, 70% or less, more preferably 50% or less, and still more preferably 35% or less. Further, whether a sulfide solid electrolyte material other than the $Li_2S$—$P_2S_5$ system sulfide solid electrolyte material does not substantially contain the cross-linked sulfur can be determined by specifying a unit containing the crosslinked sulfur and by measuring a peak of the unit.

Further, in the case of the $Li_2S$—$P_2S_5$ system sulfide solid electrolyte material, a ratio of $Li_2S$ and $P_2S_5$ for obtaining the ortho composition is, by mole, $Li_2S:P_2S_5=75:25$. The same ratio is also applied to both the case of the $Li_2S$—$Al_2S_3$ system sulfide solid electrolyte material and the case of the $Li_2S$—$B_2S_3$ system sulfide solid electrolyte material. On the other hand, in the case of the $Li_2S$—$SiS_2$ system sulfide solid electrolyte material, a ratio of $Li_2S$ and $SiS_2$ for obtaining the ortho composition is, by mole, $Li_2S:SiS_2=66.7:33.3$. The same ratio is also applied to the case of the $Li_2S$—$GeS_2$ system sulfide solid electrolyte material.

In the case where the raw material composition contains $Li_2S$ and $P_2S_5$, a ratio of $Li_2S$ to a sum total of $Li_2S$ and $P_2S_5$ is set preferably in the range of 70% by mole to 80% by mole, more preferably in the range of 72% by mole to 78% by mole, and still more preferably in the range of 74% by mole to 76% by mole. The ratio set in the same range is also applied to both the case where the raw material composition contains $Li_2S$ and $Al_2S_3$ and the case where the raw material composition contains $Li_2S$ and $B_2S_3$. On the other hand, in the case where the raw material composition contains $Li_2S$ and $SiS_2$, a ratio of $Li_2S$ to a sum total of $Li_2S$ and $SiS_2$ is set preferably in the range of 62.5% by mole to 70.9% by mole, more preferably in the range of 63% by mole to 70% by mole, and still more preferably in the range of 64% by mole to 68% by mole. The ratio set in the same range is also applied to the case where the raw material composition contains $Li_2S$ and $GeS_2$.

Now, X in LiX is a halogen that is specifically F, Cl, Br and I. Among these, Cl, Br and I are preferable. This is because a sulfide solid electrolyte material having high ion conductivity can be obtained. Further, a ratio of LiX in the sulfide solid electrolyte material of the embodiment of the invention is not particularly limited as long as it allows to synthesize desired glass ceramics. However, for example, the ratio of LiX is preferably in the range of 14% by mole or more and 30% by mole or less, and more preferably in the range of 15% by mole or more and 25% by mole or less.

The sulfide solid electrolyte material of the embodiment of the invention is in the form of particles, for example. An average particle size (D50) of the sulfide solid electrolyte material in the form of particles is preferably in the range of, for example, 0.1 μm to 50 μm. Further, the sulfide solid electrolyte material preferably has high Li ion conductivity. The Li ion conductivity thereof at room temperature is preferably, for example, $1\times10^{-4}$ S/cm or more, and more preferably $1\times10^{-3}$ S/cm or more.

The sulfide solid electrolyte material of the embodiment of the invention can be used in any applications that need the Li ion conductivity. Among these, the sulfide solid electrolyte material is preferably used in batteries.

B. Lithium Solid-State Battery

Next, a lithium solid-state battery of an embodiment of the invention will be described. A lithium solid-state battery of an embodiment of the invention includes a positive electrode active material layer containing a positive electrode active material, a negative electrode active material layer containing a negative electrode active material, and a solid electrolyte layer formed between the positive electrode active material layer and the negative electrode active material layer, and at least one of the positive electrode active material layer, the negative electrode active material layer and the solid electrolyte layer contains the sulfide solid electrolyte material.

According to the embodiment of the present invention, by use of the sulfide solid electrolyte material, the lithium solid-state battery having high Li ion conductivity can be obtained. As the result thereof, output power of the lithium battery can be made higher.

FIG. 1 is a schematic sectional view showing an example of the lithium solid-state battery of the embodiment of the invention. A lithium solid-state battery 10 shown in FIG. 1 includes a positive electrode active material layer 1 containing a positive electrode active material, a negative electrode active material layer 2 containing a negative electrode active material, a solid electrolyte layer 3 formed between the positive electrode active material layer 1 and the negative electrode active material layer 2, a positive electrode collector 4 that collects current of the positive electrode active material layer 1, and a negative electrode collector 5 that collects current of the negative electrode active material layer 2. In the embodiment of the invention, at least one of the positive electrode active material layer 1, the negative electrode active material layer 2 and the solid electrolyte layer 3 includes the sulfide solid electrolyte material described in the "A. Sulfide Solid Electrolyte Material". Respective constituents of the lithium solid-state battery of the embodiment of the invention will be described below.

1. Positive Electrode Active Material Layer

Firstly, a positive electrode active material layer in an embodiment of the invention will be described. The positive electrode active material layer in the embodiment of the invention is a layer that contains at least a positive electrode active material, and may further contain at least one of a solid electrolyte material, a conductive material and a binder, as required.

In the embodiment of the invention, a solid electrolyte material contained in the positive electrode active material layer is preferably the sulfide solid electrolyte material described in the "A. Sulfide Solid Electrolyte Material". A content of the sulfide solid electrolyte material in the positive electrode active material layer is preferably, for example, in the range of 0.1% by volume to 80% by volume, more preferably in the range of 1% by volume to 60% by volume, and particularly in the range of 10% by volume to 50% by volume.

Examples of the positive electrode active materials include, but not particularly limited to, rock salt layer like active materials such as $LiCoO_2$, $LiMnO_2$, $LiNiO_2$, $LiVO_2$ and $LiNi_{1/3}Co_{1/3}Mn_{1/3}O_2$, spinel-type active materials such as $LiMn_2O_4$ and $Li(Ni_{0.5}Mn_{1.5})O_4$, and olivine-type active materials such as $LiFePO_4$, $LiMnPO_4$, $LiNiPO_4$ and $LiCuPO_4$. Further, also silicon-containing oxides such as $Li_2FeSiO_4$ and $Li_2MnSiO_4$ may be used as the positive electrode active material.

In particular, when the sulfide solid electrolyte material has an ion conductor having an ortho composition and is formed with LiI, the positive electrode active material has preferably a potential of 2.8 V (vs. Li) or more and more preferably has a potential of 3.0 V (vs. Li) or more. This is because LiI can be effectively inhibited from oxidative decomposition. Since LiI has been considered to be decomposed in the vicinity of 2.8 V, a sulfide solid electrolyte material having LiI has not been used in a positive electrode active material layer. In contrast, the sulfide solid electrolyte material has an ion conductor having the ortho composition, and accordingly, it is considered that LiI is stabilized via an interaction with the ion conductor, thereby inhibiting LiI from oxidative decomposition.

The positive electrode active material is in the form of particles, for example, and preferably in the form of a true sphere or an oval sphere. Further, when the positive electrode active material is in the form of particles, an average particle size thereof is preferably in the range of, for example, 0.1 μm to 50 μm. Still further, a content of the positive electrode active material in the positive electrode active material layer is preferably in the range of, for example, 10% by volume to 99% by volume, and more preferably in the range of 20% by volume to 99% by volume.

The positive electrode active material layer in the embodiment of the invention may further contain, other than the positive electrode active material and the solid electrolyte material, at least one of a conductive material and a binder. Examples of the conductive material include acetylene black, Ketjen black, carbon fiber and so on. Examples of the binder include fluorine-containing binders such as PTFE and PVDF. A thickness of the positive electrode active material layer is preferably in the range of, for example, 0.1 μm to 1000 μm.

2. Negative Electrode Active Material Layer

Next, a negative electrode active material layer in the embodiment of the invention will be described. The negative electrode active material layer of the embodiment of the invention is a layer that contains at least a negative electrode active material and may further contain at least one of a solid electrolyte material, a conductive material and a binder, as required.

In the embodiment of the invention, a solid electrolyte material contained in the negative electrode active material layer is preferably the sulfide solid electrolyte material described in the "A. Sulfide Solid Electrolyte Material". A content of the sulfide solid electrolyte material in the negative electrode active material layer is preferably, for example, in the range of 0.1% by volume to 80% by volume, more preferably, in the range of 1% by volume to 60% by volume, and particularly in the range of 10% by volume to 50% by volume.

Examples of the negative electrode active material include metal active materials and carbon active materials. Examples of the metal active material include In, Al, Si and Sn. On the other hand, examples of the carbon active materials include mesocarbon microbeads (MCMB), highly ordered pyrolytic graphite (HOPG), hard carbon, soft carbon and so on. A content of the negative electrode active material in the negative electrode active material layer is preferably in the range of 10% by volume to 99% by volume, for example, and more preferably in the range of 20% by volume to 99% by volume. Both the conductive material and the binder are the same as those used in the positive electrode active material layer. A thickness of the negative electrode active material layer is preferably in the range of 0.1 μm to 1000 μm, for example.

3. Solid Electrolyte Layer

Next, the solid electrolyte layer of the embodiment of the invention will be described. The solid electrolyte layer of the embodiment of the invention is a layer that is formed between the positive electrode active material layer and the negative electrode active material layer and configured of a solid electrolyte material. The solid electrolyte material contained in the solid electrolyte layer is not particularly limited as long as it has the Li ion conductivity.

In the invention, the solid electrolyte material contained in the solid electrolyte layer is preferably the sulfide solid electrolyte material described in the "A. Sulfide Solid Electrolyte Material." A content of the sulfide solid electrolyte material in the solid electrolyte layer is not particularly limited as long as desired insulating properties are obtained. The content of the sulfide solid electrolyte material is preferably in the range of 10% by volume to 100% by volume, for example, and more particularly in the range of 50% by volume to 100% by volume. In particular, in the present invention, the solid electrolyte layer is preferably configured only of the sulfide solid electrolyte material.

Further, the solid electrolyte layer may contain a binder. This is because when the binder is contained, the solid electrolyte layer having flexibility can be obtained. Examples of the binder include fluorine-containing binders such as PTFE and PVDF. A thickness of the solid electrolyte layer is preferably in the range of 0.1 μm to 1000 μm, and more preferably in the range of 0.1 μm to 300 μm.

4. Other Configuration

The lithium solid-state battery of the embodiment of the invention includes at least the positive electrode active material layer, the negative electrode active material layer, and the solid electrolyte layer. Further, usually, the lithium solid-state battery includes a positive electrode collector that collects current of the positive electrode active material layer, and a negative electrode collector that collects current of the negative electrode active material layer. Examples of the material of the positive electrode collector include SUS, aluminum, nickel, iron, titanium, carbon and so on. Among these, SUS is preferable. On the other hand, examples of the material of the negative electrode collector include SUS, copper, nickel, carbon and so on. Among these, SUS is preferable. Further, a thickness, a shape and so on of the positive electrode collector and negative electrode collector are preferably selected appropriately in accordance with usages and so on of the lithium solid-state battery. Still furthermore, as a battery case used in the invention, a battery case for general lithium solid-state batteries can be used. An example of the battery case includes an SUS battery case.

5. Lithium Solid-State Battery

The lithium solid-state battery of the embodiment of the invention may be a primary battery or a secondary battery. However, the secondary battery is preferable. This is because the secondary battery can be repeatedly charged and discharged and is useful as a battery for automobiles. Examples of a shape of the lithium solid-state battery of the embodiment of the invention include a coin shape, a laminate shape, a cylinder shape, and a rectangular shape.

Further, the method for producing a lithium solid-state battery of the embodiment of the invention is not particularly limited as long as the above-described lithium solid-state battery can be produced. Namely, a general method for producing a lithium solid-state battery can also be used. Examples of the method for producing a lithium solid-state battery include a method in which a material that configures a positive electrode active material layer, a material that configures a solid electrolyte layer, and a material that configures a negative electrode active material layer are sequentially pressed to prepare an electricity-generating element, the electricity-generating element is housed inside of a battery case, and the battery case is caulked, and so on.

C. Method for Producing Sulfide Solid Electrolyte Material

Next, a method for producing the sulfide solid electrolyte material of the embodiment of the invention will be described. The method for producing the sulfide solid electrolyte material of the embodiment of the invention includes the steps of: amorphizing a raw material composition containing $Li_2S$, a sulfide of A (A is at least one kind of P, Si, Ge, Al, and B), and LiX (x is a halogen) to synthesize sulfide glass; and heating the sulfide glass at a temperature equal to or more than a crystallization temperature thereof to synthesize glass ceramics having peaks at $2\theta=20.2°$ and $23.6°$ in X-ray diffraction measurement with CuKα line, in which a ratio of the LiX contained in the raw material composition and a heat treatment temperature in the step of heating the sulfide glass are adjusted to obtain the glass ceramics.

Figure 2:
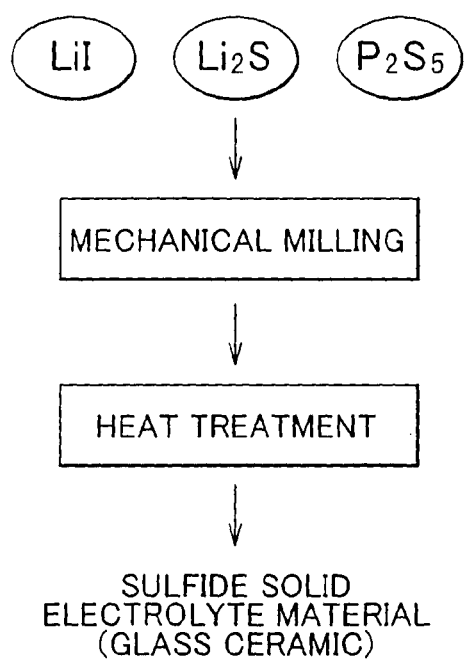
FIG. 2 is a flow chart showing an example of a method for producing a sulfide solid electrolyte material of the present invention.

FIG. 2 is a flowchart showing an example of the method for producing a sulfide solid electrolyte material of the embodiment of the invention. In FIG. 2, firstly, a raw material composition containing LiI, $Li_2S$ and $P_2S_5$ is prepared. Then, the raw material composition is mechanically milled to synthesize sulfide glass containing an ion conductor (for example, $Li_3PS_4$) containing Li, P, and S, and LiI. Next, the sulfide glass is heated at a temperature equal to or more than the crystallization temperature thereof to obtain glass ceramics (sulfide solid electrolyte material) having peaks at $2\theta=20.2°$ and $23.6°$ in X-ray diffraction measurement with CuKα line.

According to the invention, when the ratio of the LiX contained in the raw material composition and the heat treatment temperature in the step of heating the sulfide glass are adjusted, a sulfide solid electrolyte material having high Li ion conductivity can be obtained. The method for producing the sulfide solid electrolyte material of the embodiment of the invention will be described below for each step.

1. Amorphizing Step

The amorphizing step in the embodiment of the invention is a step of amorphizing a raw material composition containing $Li_2S$, a sulfide of A (A is at least one kind of P, Si, Ge, Al and B), and LiX (x is a halogen) to synthesize sulfide glass Now, $Li_2S$, a sulfide of A (A is at least one kind of P, Si, Ge, Al, and B), and LiX (x is a halogen) in the raw material composition are the same as those described in the "A. Sulfide Solid Electrolyte Material," and accordingly, description thereof will be omitted. A ratio of LiX in the raw material composition is not particularly limited as long as it allows to synthesize desired glass ceramics and varies slightly depending on a synthesis condition. The ratio of LiX in the raw material composition is preferably in the range of 14% by mole to 30% by mole or in the range of the vicinity thereof, which allows to synthesize the glass ceramics. Under the conditions of examples described below, when the ratio of LiX is more than 14% by mole and less than 30% by mole, desired glass ceramics could be obtained.

Examples of a method for amorphizing the raw material composition include a mechanical milling method and a melt quenching method. Among these, the mechanical milling method is preferred. This is because the mechanical milling method allows to process at room temperature to simplify the producing process. Further, while the melt quenching method is limited by a reaction atmosphere and a reaction vessel, the mechanical milling method is advantageous in that sulfide glass having a targeted composition can be conveniently synthesized. The mechanical milling method may be a dry mechanical milling method or a wet mechanical milling method. However, the wet mechanical milling method is preferred. This is because the raw material composition can be inhibited from adhering to a wall surface of the vessel to enable to obtain sulfide glass having higher amorphous properties.

The method of mechanical milling is not particularly limited as long as it can mix the raw material composition while imparting mechanical energy. Examples of the method include a ball mill, a vibration mill, a turbo-mill, a mechanofusion mill, and a disc mill. Among these, the ball mill is preferable, and, a satellite ball mill is particularly preferable. This is because desired sulfide glass can be efficiently obtained.

Various kinds of conditions of the mechanical milling are set so as to obtain desired sulfide glass. For example, when a satellite ball mill is used, a raw material composition and pulverizing balls are charged in a vessel and treated at a predetermined rotation speed for a predetermined time. In general, the higher the rotation speed is, the higher the speed of generation of the sulfide glass is, and the longer a processing time is, the higher the conversion rate from the raw material composition to the sulfide glass is. The rotation speed of a base when a satellite ball mill is used is, for example, in the range of 200 rpm to 500 rpm, and preferably in the range of 250 rpm to 400 rpm. Further, a processing time when the satellite ball mill is used is set, for example, in the range of one hour to 100 hours, and preferably in the range of one hour to 50 hours. Examples of materials for the vessel and the pulverizing balls for the ball mill include $ZrO_2$ and $Al_2O_3$. Further, a diameter of the pulverizing balls is, for example, in the range of 1 mm to 20 mm.

A liquid used for the wet mechanical milling preferably has a property that does not generate hydrogen sulfide during reaction with the raw material composition is preferred. Hydrogen sulfide is generated when protons dissociated from molecules of the liquid react with the raw material composition or sulfide glass. Accordingly, the liquid preferably has non-proton properties to an extent that does not generate hydrogen sulfide. Further, the non-protonic liquid can be usually roughly divided into polar non-protonic liquid and nonpolar nonprotonic liquid.

Examples of the polar nonprotonic liquid include, but not particularly limited to, ketones such as acetone, nitriles such as acetonitrile, amides such as N,N-dimethyl formamide (DMF), and sulfoxides such as dimethylsulfoxide (DMSO).

Examples of the nonpolar nonprotonic liquid include an alkane that is in the form of liquid at room temperature (25° C.). The alkane may be a chain alkane or a cyclic alkane. The chain alkane preferably has carbon atoms of 5 or more. On the other hand, the upper limit of the number of carbon atoms of the chain alkane is not particularly limited as long as it is in the form of liquid at room temperature. Specific examples of the chain alkane include pentane, hexane, heptane, octane, nonane, decane, undecane, dodecane, and paraffin. The chain alkane may have a branched chain. On the other hand, specific examples of the cyclic alkane include cyclopentane, cyclohexane, cycloheptane, cyclooctane, and cycloparaffin.

Further, other examples of the nonpolar nonprotonic liquid include aromatic hydrocarbons such as benzene, toluene, and xylene, chain ethers such as diethyl ether and dimethyl ether, cyclic ethers such as tetrahydrofuran, halogenated alkyls such as chloroform, methyl chloride, and methylene chloride, esters such as ethyl acetate, and fluorocompounds such as benzene fluoride, heptane fluoride, 2,3-dihydroperfluoropentane, and 1,1,2,2,3,3,4-heptafluorocyclopentane. An addition amount of the liquid is not particularly limited as long as it is an amount to an extent that allows to obtain a desired sulfide solid electrolyte material.

2. Heating Step

Next, the heating step in the embodiment of the invention will be described. The heating step in the embodiment of the invention is a step of heating the sulfide glass to a temperature equal to or more than the crystallization temperature thereof to synthesize glass ceramics having peaks at $2\theta=20.2°$ and $23.6°$ in X-ray diffraction measurement with CuKα line.

The heat treatment temperature is usually a temperature equal to or more than the crystallization temperature of sulfide glass. The crystallization temperature of the sulfide glass can be determined by differential thermal analysis (DTA). The heat treatment temperature is not particularly limited as long as it is a temperature equal to or higher than the crystallization temperature. However, it is preferably, for example, 160° C. or higher. On the other hand, the upper limit of the heat treatment temperature is not particularly limited as long as it is a temperature that allows to synthesize desired glass ceramics and varies slightly depending on a composition of the sulfide glass. The upper limit of the heat treatment temperature is usually a temperature that is in the vicinity of 200° C. and allows to synthesize the glass ceramics. Under the conditions of examples described below, when the heat treatment temperature is less than 200° C., desired glass ceramics could be obtained.

The heat treatment time is not particularly limited as long as the heat treatment time allows to obtain desired glass ceramics, and, preferably in the range of, for example, one minute to 24 hours. Further, the heat treatment is preferably conducted in an inert gas atmosphere (for example, Ar gas atmosphere). This is because the glass ceramics can be inhibited from deteriorating (for example, oxidation). A method of the heat treatment is not particularly limited. For example, a method that uses a firing furnace can be used.

The above embodiments are only for illustrative purpose, and anything that has substantially the same constitution and produces the same effects as a technical idea that is described in the claims of the present invention is included in the technical scope of the present invention.

EXAMPLES

The present invention will be more specifically described below with reference to examples. Unless clearly stated otherwise, the respective operations of weighting, synthesis, drying and so on were conducted under Ar atmosphere.

Example 1

As starting raw materials, lithium sulfide ($Li_2S$, manufactured by Nippon Chemical Industrial Co., Ltd.), phosphorus pentasulfide ($P_2S_5$, manufactured by Aldrich Corporation) and lithium iodide (LiI, manufactured by Aldrich Corporation) were used. Then, $Li_2S$ and $P_2S_5$ were measured to be $75Li_2S \cdot 25P_2S_5$ by mole ratio ($Li_3PS_4$, ortho composition). Next, LiI was measured so that a ratio of LiI may be 14% by mole. The measured starting raw materials were mixed in an agate mortar for 5 minutes, 2 g of the mixture was charged in a vessel (45 cc, $ZrO_2$) of a satellite ball mill, dewatered heptane (water content: 30 ppm or less, 4 g) was charged therein, further $ZrO_2$ balls (φ=5 mm, 53 g) were charged therein, and the vessel was completely hermetically sealed. The vessel was installed on a satellite ball mill machine (trade name: P7, manufactured by Fritsch Gmbh), and the mechanical milling was conducted at 500 rpm of the base for 40 hours. After that, the mixture was dried at 100° C. to remove heptane to obtain sulfide glass.

Then, 0.5 g of the resulted sulfide glass was charged in a glass tube, and the glass tube was charged in a hermetically sealed SUS vessel. The hermetically sealed vessel was heated at 190° C. for 10 hours and glass ceramics was obtained. A molar composition of the resulted glass ceramics corresponds to x=14 in $xLiI \cdot (100-x)(0.75Li_2S \cdot 0.25P_2S_5)$.

Examples 2 to 5

Glass ceramics were obtained in a manner similar to that of Example 1, except that a ratio of LiI in $xLi \cdot (100-x)(0.75Li_2S \cdot 0.25P_2S_5)$ was changed to x=15, 20, 24, and 25, respectively, and the heat treatment temperature was changed to the temperatures described in Table 1 respectively.

Comparative Examples 1 to 4

Sulfide glasses were obtained in a manner similar to that of Example 1, except that a ratio of LiI in $xLi \cdot (100-x)(0.75Li_2S \cdot 0.25P_2S_5)$ was changed to x=0, 10, 13, and 30, respectively, and the heat treatment temperature was changed to the temperatures described in Table 1 respectively.

Comparative Examples 5 to 9

Sulfide glasses were obtained in a manner similar to that of Example 1, except that a ratio of LiI in $xLiI \cdot (100-x)(0.75Li_2S \cdot 0.25P_2S_5)$ was changed to x=0, 10, 20, 30, and 40, respectively. Thereafter, without conducting the heat treatment, the sulfide glasses were prepared as reference samples.

TABLE 1

|  | Ratio of LiX $x^{(1)}$ | State$^{(2)}$ | LiI (g) | $Li_2S$ (g) | $P_2S_5$ (g) | Heat treatment temperature (° C.) |
|---|---|---|---|---|---|---|
| Example 1 | 14 | A | 0.390 | 0.616 | 0.994 | 190 |
| Example 2 | 15 | A | 0.416 | 0.606 | 0.978 | 190 |
| Example 3 | 20 | A | 0.542 | 0.558 | 0.900 | 180 |
| Example 4 | 24 | A | 0.639 | 0.521 | 0.840 | 170 |
| Example 5 | 25 | A | 0.663 | 0.512 | 0.825 | 180 |
| Comparative Example 1 | 0 | A | 0.000 | 0.766 | 1.234 | 220 |
| Comparative Example 2 | 10 | A | 0.284 | 0.657 | 1.059 | 200 |
| Comparative Example 3 | 13 | A | 0.364 | 0.626 | 1.010 | 195 |
| Comparative Example 4 | 30 | A | 0.778 | 0.468 | 0.754 | 200 |
| Comparative Example 5 | 0 | B | 0.000 | 0.766 | 1.234 | — |
| Comparative Example 6 | 10 | B | 0.284 | 0.657 | 1.059 | — |

TABLE 1-continued

| | Ratio of LiX x[1] | State[2] | LiI (g) | Li$_2$S (g) | P$_2$S$_5$ (g) | Heat treatment temperature (° C.) |
|---|---|---|---|---|---|---|
| Comparative Example 7 | 20 | B | 0.542 | 0.558 | 0.900 | — |
| Comparative Example 8 | 30 | B | 0.778 | 0.468 | 0.754 | — |
| Comparative Example 9 | 40 | B | 0.996 | 0.385 | 0.620 | — |

[1] x in xLiI · (100 − x)(0.75Li$_2$S•0.25P$_2$S$_5$)
[2] A = glass ceramics, B = sulfide glass

[Evaluation 1]
(X-Ray Diffraction Measurement)

Figure 3:
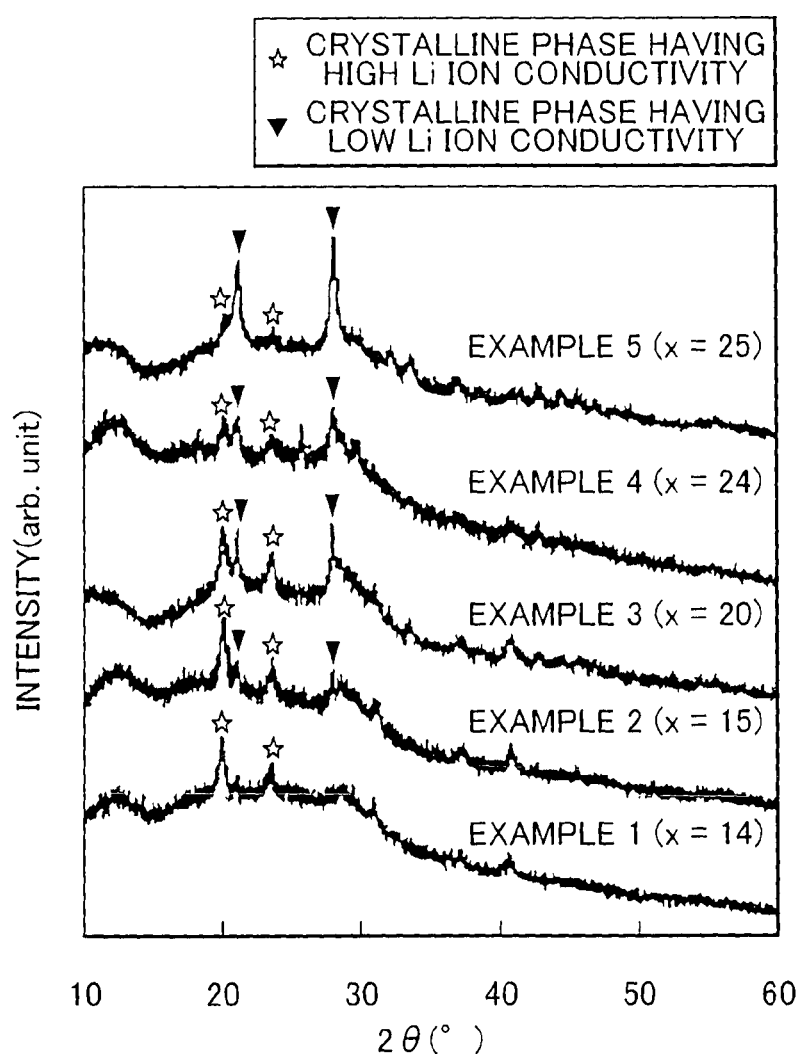
FIG. 3 shows results of X-ray diffraction measurements of glass ceramics obtained in Examples 1 to 5.
Figure 4:
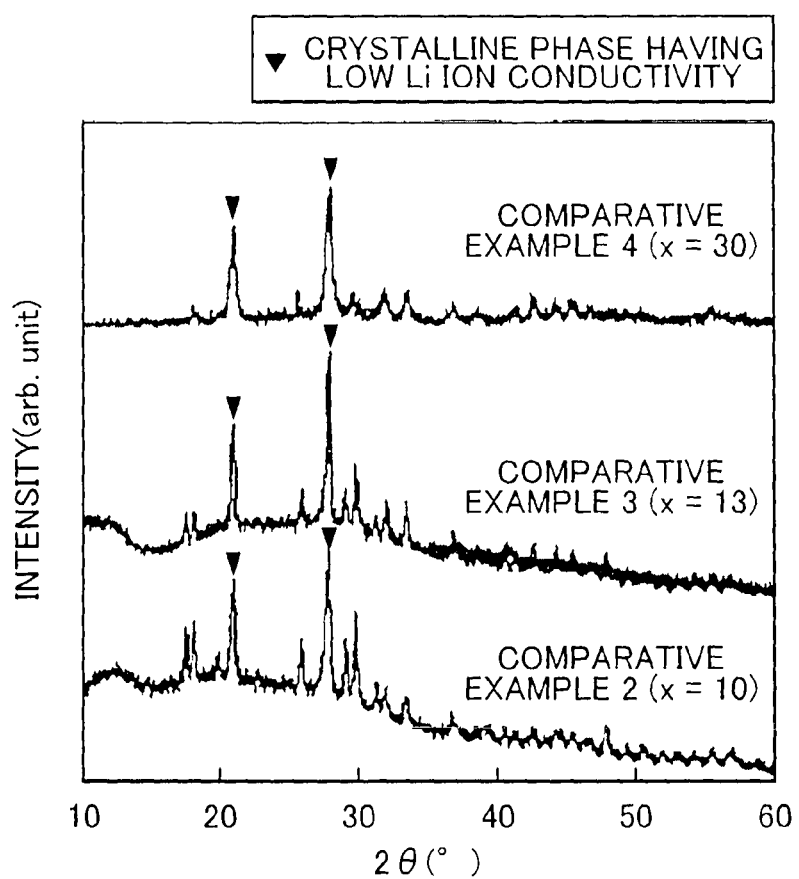
FIG. 4 shows results of X-ray diffraction measurements of glass ceramics obtained in Comparative Examples 2 to 4.

X-ray diffraction (XRD) measurements with CuKα line were conducted on the glass ceramics obtained in Examples 1 to 5 and Comparative Examples 2 to 4. In the XRD measurement, RINT Ultima III (trade name, manufactured by Rigaku Corporation) was used. Results thereof are shown in FIG. 3 and FIG. 4. As illustrated in FIG. 3, it was confirmed that each of the glass ceramics obtained in Examples 1 to 5 has peaks of a crystalline phase having high Li ion conductivity at 2θ=20.2° and 23.6°. On the other hand, as illustrated in FIG. 4, in the glass ceramics obtained in Comparative Examples 2 to 4, the peaks of the crystalline phase having the high Li ion conductivity were not confirmed, and only peaks of a crystalline phase having low Li ion conductivity at 2θ=21.0° and 28.0° were confirmed. Further, from each of the obtained XRD charts, a ratio of a peak intensity at 2θ=20.2° to a peak intensity at 2θ=21.0° ($I_{20.2}/I_{21.0}$) and a ratio of a peak intensity at 2θ=23.6° to a peak intensity at 2θ=21.0° ($I_{23.6}/I_{21.0}$) were obtained. Results thereof are shown in Table 2. In Example 1, peaks at 2θ=21.0° and 28.0° were not confirmed, and accordingly, the ratio of peak intensities was not obtained.

TABLE 2

| | Ratio of LiI x[1] | State[2] | $I_{20.2}/I_{21.0}$ | $I_{23.6}/I_{21.0}$ |
|---|---|---|---|---|
| Example 1 | 14 | A | — | — |
| Example 2 | 15 | A | 2.6 | 1.1 |
| Example 3 | 20 | A | 1.1 | 0.7 |
| Example 4 | 24 | A | 1 | 0.4 |
| Example 5 | 25 | A | 0.3 | 0.2 |
| Comparative Example 1 | 0 | A | 0 | 0 |
| Comparative Example 2 | 10 | A | 0 | 0 |
| Comparative Example 3 | 13 | A | 0 | 0 |
| Comparative Example 4 | 30 | A | 0 | 0 |

[1] x in xLiI · (100 − x)(0.75Li$_2$S · 0.25P$_2$S$_5$)
[2] A = glass ceramics (Measurement of Li Ion Conductivity)

The Li ion conductivity (at room temperature) was measured on each of the samples obtained in Examples 1 to 5 and Comparative Examples 1 to 9 by AC impedance method. The Li ion conductivity was measured as described below. Firstly, a sample powder was cold-pressed under pressure of 4 ton/cm$^2$ and a pellet having a diameter of 11.29 mm and a thickness of about 500 μm was prepared. Next, the pellet was installed in a vessel of inert gas atmosphere, which is filled with Ar gas, to perform measurement. In the measurement, SOLARTRON (trade name: SI1260, manufactured by Toyo Corporation) was used. A measurement temperature was controlled to 25° C. by use of a thermostat. Results are shown in Table 3 and FIG. 5.

TABLE 3

| | Ratio of LiX x[1] | State[2] | Li ion conductivity (S/cm) |
|---|---|---|---|
| Example 1 | 14 | A | 2.9 × 10$^{-3}$ |
| Example 2 | 15 | A | 3.4 × 10$^{-3}$ |
| Example 3 | 20 | A | 3.0 × 10$^{-3}$ |
| Example 4 | 24 | A | 2.9 × 10$^{-3}$ |
| Example 5 | 25 | A | 1.2 × 10$^{-3}$ |
| Comparative Example 1 | 0 | A | 1.0 × 10$^{-4}$ |
| Comparative Example 2 | 10 | A | 1.3 × 10$^{-4}$ |
| Comparative Example 3 | 13 | A | 9.6 × 10$^{-5}$ |
| Comparative Example 4 | 30 | A | 3.7 × 10$^{-4}$ |
| Comparative Example 5 | 0 | B | 5.0 × 10$^{-4}$ |
| Comparative Example 6 | 10 | B | 6.9 × 10$^{-4}$ |
| Comparative Example 7 | 20 | B | 9.7 × 10$^{-4}$ |
| Comparative Example 8 | 30 | B | 1.3 × 10$^{-3}$ |
| Comparative Example 9 | 40 | B | 1.0 × 10$^{-3}$ |

Figure 5:
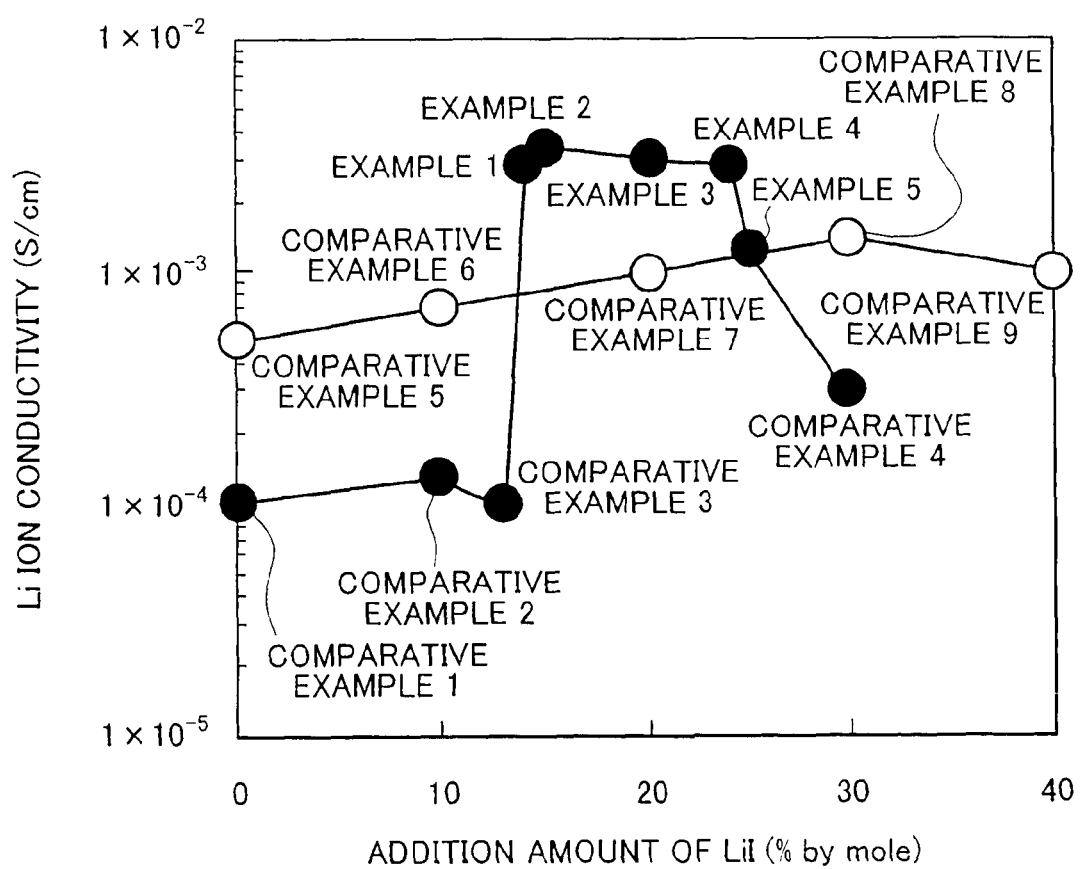
FIG. 5 shows results of measurements of Li ion conductivity of samples obtained in Examples 1 to 5 and Comparative Examples 1 to 9.

[1] x in xLiI · (100 − x)(0.75Li$_2$S•0.25P$_2$S$_5$)
[2] A = glass ceramics, B = sulfide glass As illustrated in Table 3 and FIG. 5, all of the glass ceramics obtained in Examples 1 to 5 had high Li ion conductivity. This is considered because the glass ceramics obtained in Examples 1 to 5 have a crystalline phase having high Li ion conductivity, which has peaks at 2θ=20.2° and 23.6°. Further, the content of LiI x is the same between Comparative Example 1 and Comparative Example 5, between Comparative Example 2 and Comparative Example 6, and between Comparative Example 4 and Comparative Example 8, respectively. As described above, when sulfide glass doped with LiI is heat-treated, usually, the Li ion conductivity is deteriorated. On the other hand, in the glass ceramics obtained in Examples 1 to 5, a peculiar behavior that, when the sulfide glass is heat-treated, the Li ion conductivity is improved was exhibited, and further, the Li ion conductivity was extremely high as the glass ceramics.

Examples 6 to 8

Glass ceramics were obtained in a manner similar to that of Example 1, except that the ratio of LiI in xLi·(100−x)(0.75Li$_2$S·0.25P$_2$S$_5$) was changed to x=15, and the heat treatment temperature was changed to 170° C., 180° C. and 190° C., respectively.

Comparative Example 10

Sulfide glass was obtained in a manner similar to that of Example 1, except that the ratio of LiI in xLi·(100−x)(0.75Li$_2$S·0.25P$_2$S$_5$) was changed to x=15. Thereafter, without conducting the heat treatment, sulfide glass for reference sample was obtained.

Comparative Example 11

Glass ceramics was obtained in a manner similar to that of Example 1, except that the ratio of LiI in xLi·(100−x)(0.75Li$_2$S·0.25P$_2$S$_5$) was changed to x=15, and the heat treatment temperature was changed to 200° C.

[Evaluation 2]
(X-Ray Diffraction Measurement)

Figure 6:
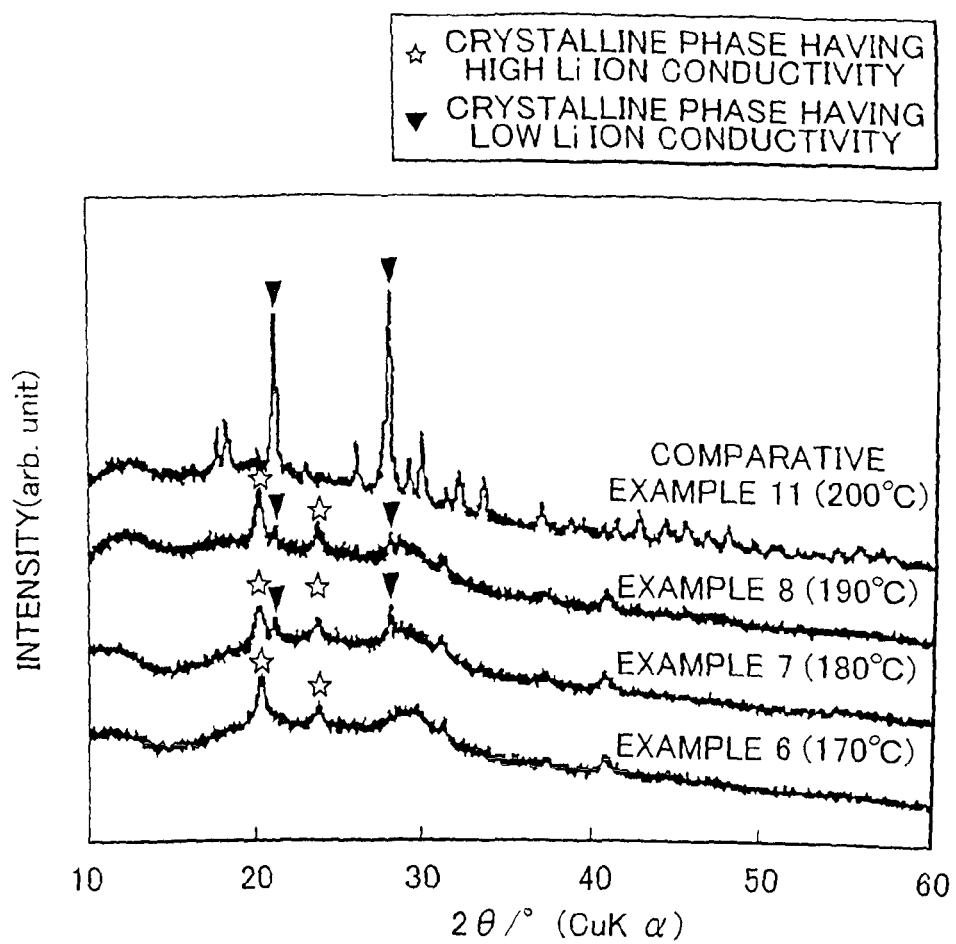
FIG. 6 shows results of X-ray diffraction measurements of glass ceramics obtained in Examples 6 to 8 and Comparative Example 11.

An X-ray diffraction (XRD) measurement with CuKα line was conducted on each of the glass ceramics obtained in Examples 6 to 8 and Comparative Example 11. A measurement method was the same as that described in the Evaluation 1. Results are shown in FIG. 6. As illustrated in FIG. 6, it was confirmed that each of the glass ceramics obtained in Examples 6 to 8 has peaks of a crystalline phase having high Li ion conductivity at 2θ=20.2° and 23.6°. On the other hand, in the glass ceramics obtained in Comparative Example 11, while peaks of the crystalline phase having high Li ion conductivity were not confirmed, only peaks of a crystalline phase having low Li ion conductivity at 2θ=21.0° and 28.0° were confirmed.

(Measurement of Li Ion Conductivity)

Figure 7:
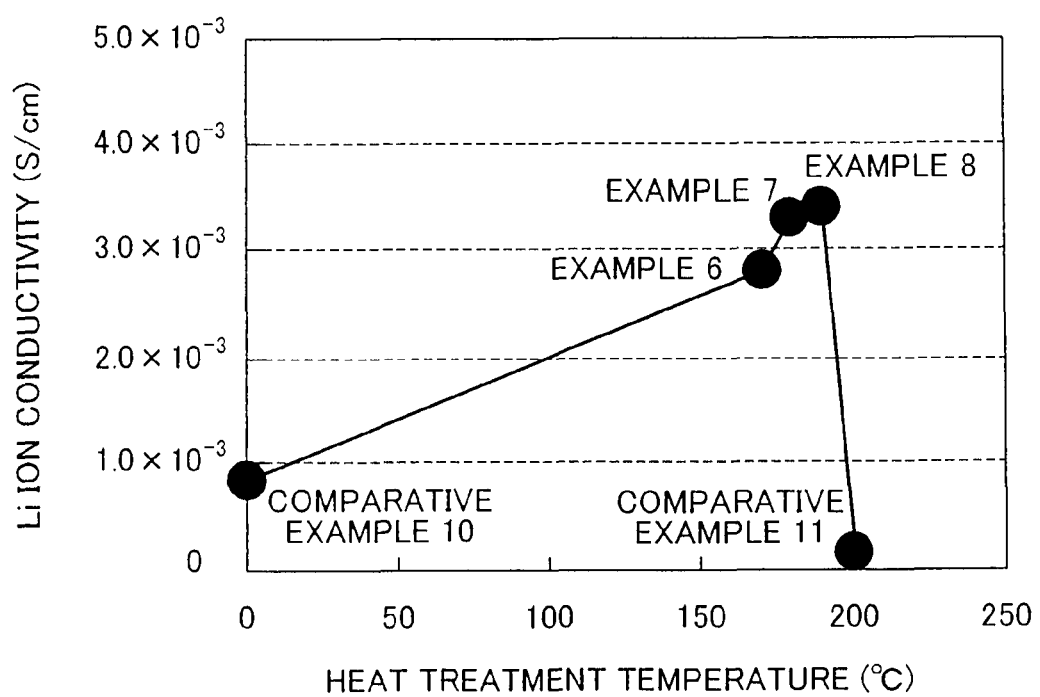
FIG. 7 shows results of measurements of Li ion conductivity on samples obtained in Examples 6 to 8 and Comparative Examples 10 to 11.

The Li ion conductivity (room temperature) was measured on each of the samples obtained in Examples 6 to 8 and Comparative Examples 10 and 11 by AC impedance method. The measurement method was the same as that described in the Evaluation 1. Results thereof are shown in FIG. 7. As illustrated in FIG. 7, all of the glass ceramics obtained in Examples 6 to 8 exhibited the Li ion conductivity higher than that of Comparative Example 10 in which the heat treatment was not conducted. On the other hand, in the sample obtained in Comparative Example 11, it is considered that the heat treatment temperature was too high to obtain the crystalline phase having high Li ion conductivity.

The invention claimed is:

1. A sulfide solid electrolyte material comprising:
   Li, A, X and S,
   wherein:
   the sulfide solid electrolyte material is a glass ceramic,
   A is at least one element selected from the group consisting of P, Si, Ge, Al, and B,
   X is a halogen, and
   the sulfide solid electrolyte material has peaks at 2θ=20.2° and 23.6° in an X-ray diffraction measurement with CuKα line.

2. The sulfide solid electrolyte material according to claim 1, wherein a ratio of a peak intensity at 2θ=20.2° to a peak intensity at 2=21.0° is 1 or more.

3. The sulfide solid electrolyte material according to claim 1, wherein the sulfide solid electrolyte material does not contain cross-linked sulfur.

4. The sulfide solid electrolyte material according to claim 1, further comprising an ion conductor comprising Li, A, S, and LiX, where A is at least one element selected from the group consisting of P, Si, Ge, Al, and B; and X is a halogen.

5. The sulfide solid electrolyte material according to claim 4, wherein a ratio of the LiX is 14% by mole or more and less than 30% by mole.

6. The sulfide solid electrolyte material according to claim 4, wherein the ratio of the LiX is more than 14% by mole and less than 30% by mole.

7. The sulfide solid electrolyte material according to claim 6, wherein the ratio of the LiX is more than 14% by mole and 25% by mole or less.

8. The sulfide solid electrolyte material according to claim 4, wherein the ion conductor has an ortho composition.

9. The sulfide solid electrolyte material according to claim 1, further comprising 50% by mole or more of a crystalline phase corresponding to the peaks at 2θ=20.2° and 23.6° relative to a total crystalline phase of the sulfide solid electrolyte material.

10. A lithium solid-state battery comprising:
    a positive electrode active material layer containing a positive electrode active material;
    a negative electrode active material layer containing a negative electrode active material; and
    a solid electrolyte layer disposed between the positive electrode active material layer and the negative electrode active material layer,
    wherein at least one of the positive electrode active material layer, the negative electrode active material layer, and the solid electrolyte layer comprises the sulfide solid electrolyte material according to claim 1.

11. The lithium solid-state battery according to claim 10, wherein:
    the sulfide solid electrolyte material further comprises an ion conductor comprising Li, A, S, and LiX,
    the ion conductor has an ortho composition,
    LiX is LiI, and
    the positive electrode active material has a potential of 2.8 V or more with respect to Li.

* * * * *